(12) United States Patent
Freeman et al.

(10) Patent No.: US 6,722,847 B2
(45) Date of Patent: Apr. 20, 2004

(54) FAN FOR A TURBOFAN GAS TURBINE ENGINE

(75) Inventors: Christopher Freeman, Nottingham (GB); Adam M Bagnall, Derby (GB)

(73) Assignee: Rolls-Royce plc, London (GB)

( * ) Notice: Subject to any disclaimer, the term of this patent is extended or adjusted under 35 U.S.C. 154(b) by 82 days.

(21) Appl. No.: 10/226,078

(22) Filed: Aug. 23, 2002

(65) Prior Publication Data

US 2003/0099543 A1 May 29, 2003

(30) Foreign Application Priority Data

Nov. 23, 2001 (GB) .............................................. 0128087

(51) Int. Cl.⁷ ............................................. F01D 01/02
(52) U.S. Cl. ................... 415/199.4; 415/65 R; 415/119
(58) Field of Search ........................... 415/199.4, 199.5, 415/65 R, 119, DIG. 2, 1, 115

(56) References Cited

U.S. PATENT DOCUMENTS

| | | | | |
|---|---|---|---|---|
| 4,300,656 A | * | 11/1981 | Burcham | .................. 181/224 |
| 4,790,133 A | * | 12/1988 | Stuart | .................... 60/226.1 |
| 5,169,288 A | * | 12/1992 | Gliebe et al. | ............... 415/119 |
| 5,261,227 A | * | 11/1993 | Giffin, III | ................. 60/226.1 |
| 5,632,658 A | | 5/1997 | Chen | |
| 6,409,469 B1 | * | 6/2002 | Tse | ............................ 415/119 |

FOREIGN PATENT DOCUMENTS

| | | |
|---|---|---|
| GB | 431968 P | 7/1935 |
| GB | 1257497 A | 12/1971 |
| GB | 1309721 P | 3/1973 |
| GB | 2066370 A | 7/1981 |

* cited by examiner

*Primary Examiner*—Edward K. Look
*Assistant Examiner*—J. M. McAleenan
(74) *Attorney, Agent, or Firm*—W. Warren Taltavull; Manelli, Denison & Selter PLLC

(57) ABSTRACT

A fan (22) for a turbofan gas turbine engine (10) comprises a fan rotor (24) carrying a first set of circumferentially spaced radially extending fan blades (28) and a second set of circumferentially spaced radially extending fan blades (30). The second set of fan blades (30) is arranged downstream of the first set of fan blades (28). The hub to tip ratio ($R_1/R_2$) of the first set of fan blades (28) is substantially the same as the hub to tip ratio ($R_3/R_4$) of the second set of fan blades (30) and the radius ($R_2$) of the radially outer ends of the first set of fan blades (28) is less than the radius ($R_4$) of the radially outer ends of the second set of fan blades (30). This increases the flow area of the fan (22) by about 7% compared to a conventional fan of the same radius and thus increases the mass flow by about 7% and/or increases the pressure ratio.

16 Claims, 2 Drawing Sheets

FAN FOR A TURBOFAN GAS TURBINE ENGINE

The present invention relates to a fan for a turbofan gas turbine engine.

A conventional turbofan gas turbine engine includes a fan, which comprises a fan rotor carrying a single set of circumferentially spaced radially extending fan blades. The ratio of the radius of the radially inner ends of the fan blades to the radius of the radially outer ends of the fan blades, also known as the hub to tip ratio, is about 0.3 for a conventional turbofan gas turbine engine. The problem with this arrangement is that the flow area through the fan is about 90% of the available projected area and thus the mass flow capacity of the fan is limited.

Accordingly the present invention seeks to provide a novel fan for a gas turbine engine which reduces, preferably overcomes, the above mentioned problem.

Accordingly the present invention provides a fan for a turbofan gas turbine engine comprising a fan rotor carrying a first set of circumferentially spaced radially extending fan blades and a second set of circumferentially spaced radially extending fan blades, the second set of fan blades being arranged downstream of the first set of fan blades, the ratio of the radius of the radially inner ends of the first set of fan blades to the radius of the radially outer ends of the first set of fan blades is similar to the ratio of the radius of the radially inner ends of the second set of fan blades to the radius of the radially outer ends of the second set of fan blades, the radius of the radially inner ends of the first set of fan blades is less than the radius of the radially inner ends of the second set of fan blades and the radius of the radially outer ends of the first set of fan blades is less than the radius of the radially outer ends of the second set of fan blades.

Preferably the ratio of the radius of the radially inner ends of the first set of fan blades to the radius of the radially outer ends of the first set of fan blades is between 0.25 and 0.5, preferably 0.3.

Preferably the ratio of the radius of the radially inner ends of the second set of fan blades to the radius of the radially outer ends of the second set of fan blades is between 0.25 and 0.5, preferably 0.3.

Preferably the ratio of the radius of the radially inner ends of the first set of fan blades to the radius of the radially outer ends of the first set of fan blades is substantially the same as the ratio of the radius of the radially inner ends of the second set of fan blades to the radius of the radially outer ends of the second set of fan blades.

Preferably the radius of the radially outer ends of the first set of fan blades is between 40% and 70% of the radius of the radially outer ends of the second set of fan blades.

Preferably the radius of the radially outer ends of the first set of fan blades is 60% of the radius of the radially outer ends of the second set of fan blades.

Preferably the number of fan blades in the first set of fan blades is equal to the number of fan blades in the second set of fan blades.

Alternatively the number of fan blades in the first set of fan blades is equal to a multiple of the number of fan blades in the second set of fan blades.

The number of fan blades in the first set of fan blades may be equal to four times, three times, twice, a quarter, a third or a half of the number of fan blades in the second set of fan blades.

Preferably each of the fan blades in the first set of fan blades is arranged circumferentially between two of the fan blades in the second set of fan blades.

Alternatively each of the fan blades in the first set of fan blades is arranged substantially in the same radial plane as a corresponding one of the fan blades in the second set of fan blades.

Preferably the ratio of the radius of the radially inner ends of the leading edge of the first set of fan blades to the radius of the radially outer ends of the leading edges of the second set of fan blades is between 0.0625 and 0.25, preferably 0.15.

The present invention will be more fully described by way of example with reference to the accompanying drawings in which:—

Figure 1:
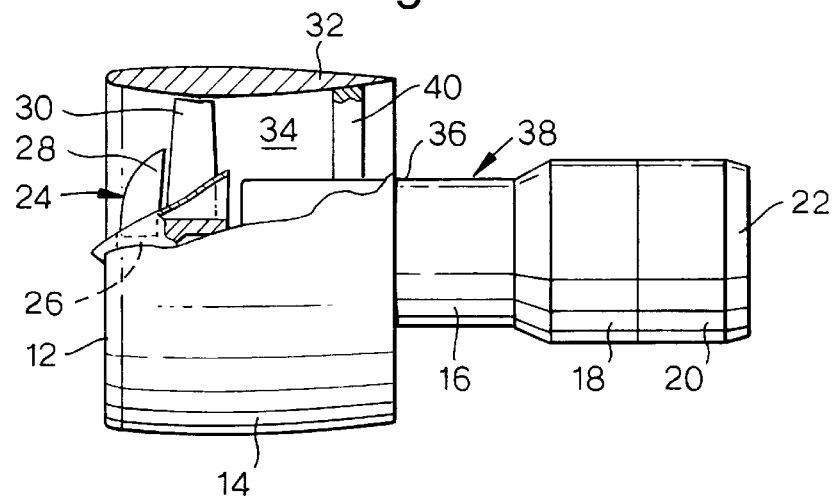
FIG. 1 is a partially cut away view of a turbofan gas turbine engine comprising a fan according to the present invention.

A turbofan gas turbine engine 10 comprising a fan 24, according to the present invention, is shown in FIG. 1. The turbofan gas turbine engine 10 comprises in flow series an intake 12, a fan section 14, a compressor section 16, a combustion section 18, a turbine section 20 and an exhaust 22.

The fan section 14 includes a fan 24 comprising a fan rotor 26 carrying a first set of circumferentially spaced radially outwardly extending fan blades 28 and carrying a second set of circumferentially spaced radially outwardly extending fan blades 30. The second set of fan blades 30 is arranged downstream of the first set of fan blades 28. The fan 24 is surrounded by a fan casing 32 which defines a fan duct 34 and the fan casing 32 is connected to the casing 36 of the main engine 38 by a set of circumferentially spaced radially extending fan outlet guide vanes 40.

The turbine section 20 comprises a low pressure turbine (not shown) arranged to drive the fan 24 via a shaft (not shown) and a high pressure turbine (not shown) arranged to drive a high pressure compressor (not shown) in the compressor section 16 via a shaft (not shown). The turbine section 20 may also comprise an intermediate pressure turbine (not shown) arranged to drive an intermediate pressure compressor (not shown) via a shaft (not shown).

Figure 2:
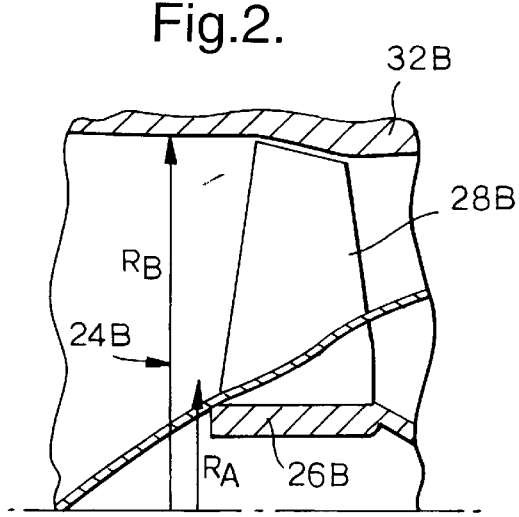
FIG. 2 is a schematic radial cross-sectional view of a prior art fan.

A conventional fan 24B, as shown in FIG. 2, comprises a fan rotor 26B carrying a single set of circumferentially spaced radially outwardly extending fan blades 28B. The ratio of the radius $R_A$ of the radially inner ends of the fan blades 28B to the radius $R_B$ of the radially outer ends of the fan blades 28B, also known as the hub to tip ratio, is about 0.3 for a conventional turbofan gas turbine engine. As mentioned previously, the problem with this arrangement is that the flow area through the fan 24B is about 90% of the available projected area and thus the mass flow capacity of the fan 24B is limited.

Figure 3:
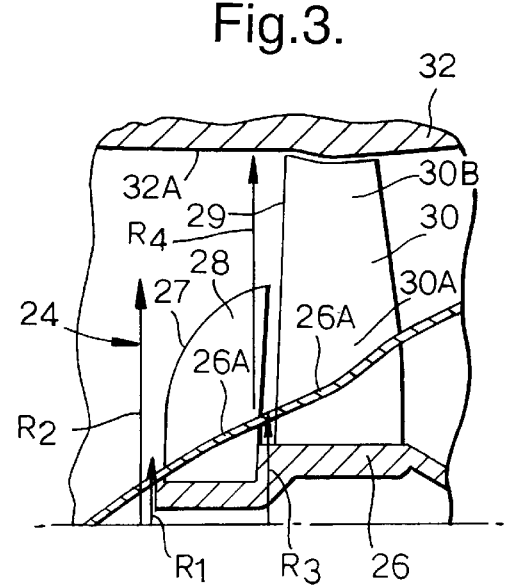
FIG. 3 is a schematic enlarged radial cross-sectional view of a fan according to the present invention shown in FIG. 1.
Figure 4:
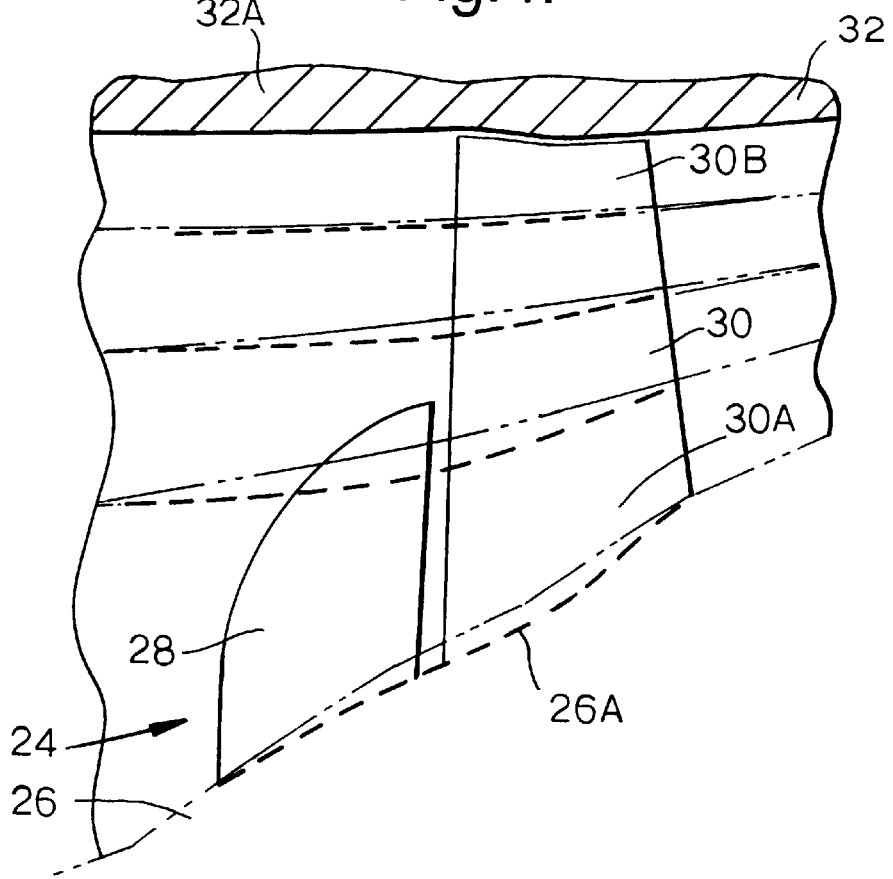
FIG. 4 is a schematic radial cross-sectional view of the fan according to the present invention shown in FIG. 3 illustrating the redistribution in the airflow.

A fan 24 according to the present invention, as shown more clearly in FIGS. 3 and 4, increases the mass flow and/or the pressure ratio of the fan 24. The fan 24 is provided with two sets of fan blades 28 and 30. The second set of fan blades 30 is arranged downstream of the first set of fan blades 28.

The ratio of the radius $R_1$ of the radially inner ends of the fan blades 28 to the radius $R_2$ of the radially outer ends of the fan blades 28, also known as the hub to tip ratio, is substantially the same as the ratio of the radius $R_3$ of the radially inner ends of the fan blades 30 to the radius $R_4$ of the radially outer ends of the fan blades 30. In this particular example the ratio of the radius $R_1$ of the radially inner ends of the fan blades 28 to the radius $R_2$ of the radially outer ends of the fan blades 28, also known as the hub to tip ratio, is between 0.25 and 0.5, for example about 0.3. The ratio of the radius $R_3$ of the radially inner ends of the fan blades 30 to the radius $R_4$ of the radially outer ends of the fan blades 30, also known as the hub to tip ratio, is between 0.25 and 0.5, for example about 0.3.

The radius $R_1$ of the radially inner ends of the first set of fan blades 28 is less than the radius $R_3$ of the radially inner ends of the second set of fan blades 30. The radius $R_2$ of the radially outer ends of the first set of fan blades 28 is less than the radius $R_4$ of the second set of fan blades 30. In this particular example the radius $R_2$ of the radially outer ends of the first set of fan blades 28 is between 40% and 70%, for example 60%, of the radius $R_4$ of the second set of fan blades 30. Thus it is seen that the air washed outer surface 26A of the fan rotor 26 increases in radius in a downstream direction and the inner surface 32A of the fan casing 32 remains at a substantially constant radius upstream of the second set of fan blades 30.

In operation the first and second sets of fan blades 28 and 30 act as one set of fan blades. The leading edge 27 of the first set of fan blades 28 forms the leading edge of the combined set of fan blades for the portion of the combined set of fan blades radially nearest the fan rotor 26. The leading edge 29 of the second set of fan blades 30 forms the leading edge of the combined set of fan blades radially for the portion radially nearest the fan casing 32. The leading edge of the combined set of fan blades has a ratio of the radius $R_1$ of the radially inner ends of the fan blades 28 to the radius $R_4$ of the radially outer ends of the fan blades 30, also known as the hub to tip ratio, of between 0.0625 and 0.25, for example about 0.15.

This increases the flow area of the fan 22 by about 7% compared to a conventional fan 22B of the same radius and thus increases the mass flow by about 7%. Alternatively this allows the radius of the fan 22, the weight and drag of the fan casing 32 to be reduced and an increased low pressure turbine speed, compared to a conventional fan 22B, while providing the same mass flow.

The first set of fan blades 28 add work to the airflow such that more air flows through the radially inner region, hub, 30A of the second set of fan blades 30. This allows a greater total air flow to be passed through the fan 24 for a given axial flow velocity at the radially outer region, tip, 30B of the fan 24.

The pressure ratio at a speed is limited by the stall line in prior art supersonic fans and the peak efficiency line converges on the surge line at about a pressure ratio of 2.1, as described by Freeman and Cumpsty in ASME 89-GT-326. The high fan blade tip speed, which is normally necessary for high pressure, causes this convergence in the peak efficiency line and the surge line.

The speed of rotation at the tip 30B may be reduced by reducing the speed of rotation of the fan rotor 26. The speed at the hub region 30A at the fan 24 exit, necessary for high pressure ratio, may be restored by increasing the radius of the air washed outer surface 26A of the fan rotor 26 at fan 24 exit. In this way the fan 24 is designed to have a substantial amount of centrifugal compression. This is due to the increasing radius of the air washed outer surface 26A of the fan rotor 26 in the downstream direction and a substantially constant radius of the inner surface 32A of the fan casing 32 at the tip region 30B of the fan 24. The first set of fan blades 28 are advantageous in maintaining a low axial velocity at the tip region 30B of the fan 24 with the steeply increasing radius of the air washed outer surface 26A of the fan rotor 26.

Thus the present invention effectively increases the mass flow through the fan 22 by effectively reducing the hub to tip ratio of the fan 22 by the provision of these two sets of fan blades 28 and 30. It is aerodynamically favourable to have a low hub to tip ratio, but it may not be mechanically favourable to have a low hub to tip ratio. The present invention effectively reduces the aerodynamic hub to tip ratio of the fan without reducing the mechanical hub to tip ratio of the fan.

FIG. 4 illustrates the effect of the first set of fan blades 28. The first set of fan blades 28 draws the air flow radially inwardly towards the hub region 30A of the second set of fan blades 30 to allow more air to flow in the tip region 30B of the second set of fan blades 30.

Figure 5:
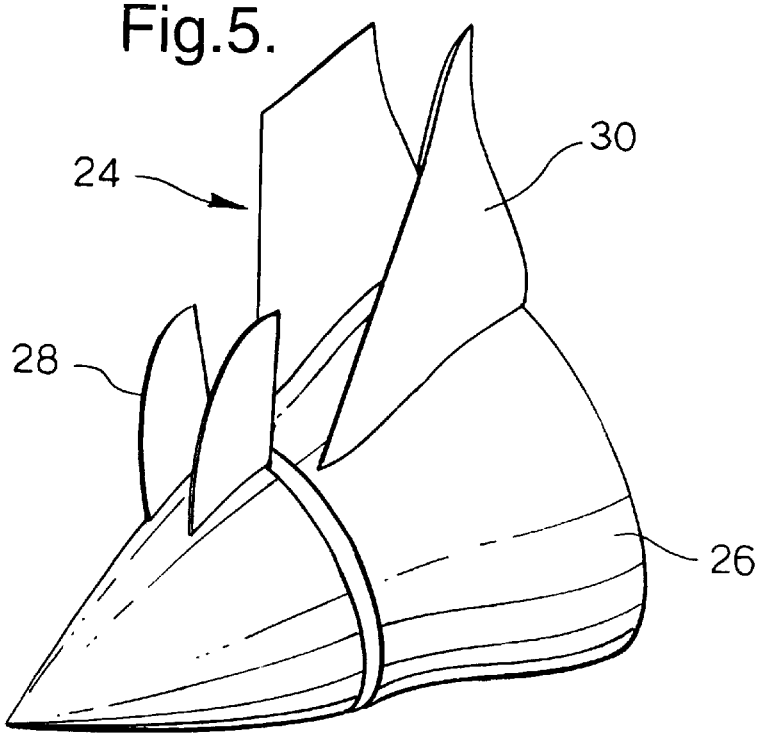
FIG. 5 is a perspective view of a fan according to the present invention.

As shown in FIG. 5 each fan blade in the first set of fan blades 28 is arranged at an optimum circumferential angular position relative to a corresponding one of the fan blades in the second set of fan blades 30. In FIG. 5 each fan blade in the first set of fan blades 28 is arranged circumferentially, angularly, between a corresponding pair of the fan blades in the second set of fan blades 30.

However, it is possible for each fan blade in the first set of fan blades 28 to be arranged circumferentially, angularly, directly axially upstream of a corresponding one of the fan blades in the second set of fan blades 30, so as to make a continuous fan blade of extended chordal length. It may be necessary to provide a seal between the trailing edge of the fan blades in the first set of fan blades 28 and the leading edge of the fan blades in the second set of fan blades 30.

The number of fan blades in the first set of fan blades 28 is preferably equal to the number of fan blades in the second set of fan blades 30. However, the number of fan blades in the first set of fan blades 28 may be more, or less, than the number of fan blades in the second set of fan blades 30. The number of fan blades in the first set of fan blades 28 may be equal to a multiple of the number of fan blades in the second set of fan blades 30. The number of fan blades in the first set of fan blades 28 may be equal to four times, three times, twice, a quarter, a third or a half of the number of fan blades in the second set of fan blades 30.

The fan rotor 26 may comprise a single disc upon which the first and second sets of fan blades 28 and 30 are mounted. Alternatively the fan rotor 26 may comprise two discs, which are secured together, and one set of fan blades is mounted on each of the two discs. The fan blades of the first and second sets of fan blades 28 and 30 may comprise individual fan blades each of which comprises a root for engagement in a corresponding slot in the corresponding fan rotor disc. Alternatively the fan blades of the first and second sets of fan blades 28 and 30 may be integrally mounted on the fan rotor disc by friction welding, diffusion bonding or by machined from a solid blank.

Although the present invention has been described with reference to the ratio of the radius $R_1$ to the radius $R_2$ of the first set of fan blades 28, being substantially the same as the ratio of the radius $R_3$ to the radius $R_4$ of the second set of fan blades 30, it is equally possible to use arrangements where the ratio of the radius $R_1$ to the radius $R_2$ of the first set of fan blades 28, is similar to the ratio of the radius $R_3$ to the radius $R_4$ of the second set of fan blades 30. The ratio of the radius $R_1$ to the radius $R_2$ of the fan blades 28, is similar to the ratio of the radius $R_3$ to the radius $R_4$ of the fan blades 30 if each of the ratios is between 0.25 and 0.5.

Thus for example the ratio of the radius $R_1$ to the radius $R_2$ of the first set of fan blades 28 is 0.5 and the ratio of the radius $R_3$ to the radius $R_4$ of the second set of fan blades 30 is 0.3. In another example the ratio of the radius $R_1$ to the radius $R_2$ of the first set of fan blades 28 is 0.3 and the ratio of the radius $R_3$ to the radius $R_4$ of the second set of fan blades 30 is 0.5.

If the ratio of the radius $R_1$ to the radius $R_2$ of the first set of fan blades 28 is 0.5 and the ratio of the radius $R_3$ to the radius $R_4$ of the second set of fan blades 30 is 0.5, the arrangement would provide an extra 18% flow through the fan 24.

We claim:

1. A fan for a turbofan gas turbine engine comprising a fan rotor carrying a first set of circumferentially spaced radially extending fan blades and a second set of circumferentially spaced radially extending fan blades, the second set of fan blades being arranged downstream of the first set of fan blades, the ratio of the radius of the radially inner ends of the first set of fan blades to the radius of the radially outer ends of the first set of fan blades is substantially the same as the ratio of the radius of the radially inner ends of the second set of fan blades to the radius of the radially outer ends of the second set of fan blades, the radius of the radially inner ends of the first set of fan blades is less than the radius of the radially inner ends of the second set of fan blades and the radius of the radially outer ends of the first set of fan blades is less than the radius of the radially outer ends of the second set of fan blades.

2. A fan as claimed in claim 1 wherein the ratio of the radius of the radially inner ends of the first set of fan blades to the radius of the radially outer ends of the first set of fan blades is between 0.25 and 0.5.

3. A fan as claimed in claim 1 wherein the radius of the radially outer ends of the first set of fan blades is between 40% and 70% of the radius of the radially outer ends of the second set of fan blades.

4. A fan as claimed in claim 3 wherein the radius of the radially outer ends of the first set of fan blades is 60% of the radius of the radially outer ends of the second set of fan blades.

5. A fan as claimed in claim 1 wherein the number of fan blades in the first set of fan blades is equal to the number of fan blades in the second set of fan blades.

6. A fan as claimed in claim 1 wherein the number of fan blades in the first set of fan blades is equal to a multiple of the number of fan blades in the second set of fan blades.

7. A fan as claimed in claim 6 wherein the number of fan blades in the first set of fan blades is equal to one of four times, three times, twice, a quarter, a third or a half of the number of fan blades in the second set of fan blades.

8. A fan as claimed in claim 1 wherein each of the fan blades in the first set of fan blades is arranged circumferentially between two of the fan blades in the second set of fan blades.

9. A fan as claimed in claim 1 wherein each of the fan blades in the first set of fan blades is arranged substantially in the same radial plane as a corresponding one of the fan blades in the second set of fan blades.

10. A fan as claimed in claim 1 wherein the ratio of the radius of the radially inner ends of the leading edge of the first set of fan blades to the radius of the radially outer ends of the leading edges of the second set of fan blades is between 0.0625 and 0.25.

11. A fan as claimed in claim 1 wherein the ratio of the radius of the radially inner ends of the second set of fan blades to the radius of the radially outer ends of the second set of fan blades is between 0.25 and 0.5.

12. A fan as claimed in claim 1 wherein the ratio of the radius of the radially inner ends of the first set of fan blades to the radius of the radially outer ends of the first set of fan blades is 0.3 and ratio of the radius of the radially inner ends of the second set of fan blades to the radius of the radially outer ends of the second set of fan blades is 0.3.

13. A fan as claimed in claim 1 wherein the ratio of the radius of the radially inner ends of the first set of fan blades to the radius of the radially outer ends of the first set of fan blades is 0.5 and ratio of the radius of the radially inner ends of the second set of fan blades to the radius of the radially outer ends of the second set of fan blades is 0.3.

14. A fan as claimed in claim 1 wherein the ratio of the radius of the radially inner ends of the first set of fan blades to the radius of the radially outer ends of the first set of fan blades is 0.3 and ratio of the radius of the radially inner ends of the second set of fan blades to the radius of the radially outer ends of the second set of fan blades is 0.5.

15. A fan as claimed in claim 1 wherein the ratio of the radius of the radially inner ends of the first set of fan blades to the radius of the radially outer ends of the first set of fan blades is 0.5 and ratio of the radius of the radially inner ends of the second set of fan blades to the radius of the radially outer ends of the second set of fan blades is 0.5.

16. A fan as claimed in claim 1 wherein the fan rotor has an outer surface and the outer surface of the fan rotor increases in radius in a downstream direction.

\* \* \* \* \*